United States Patent Office 2,795,950
Patented June 18, 1957

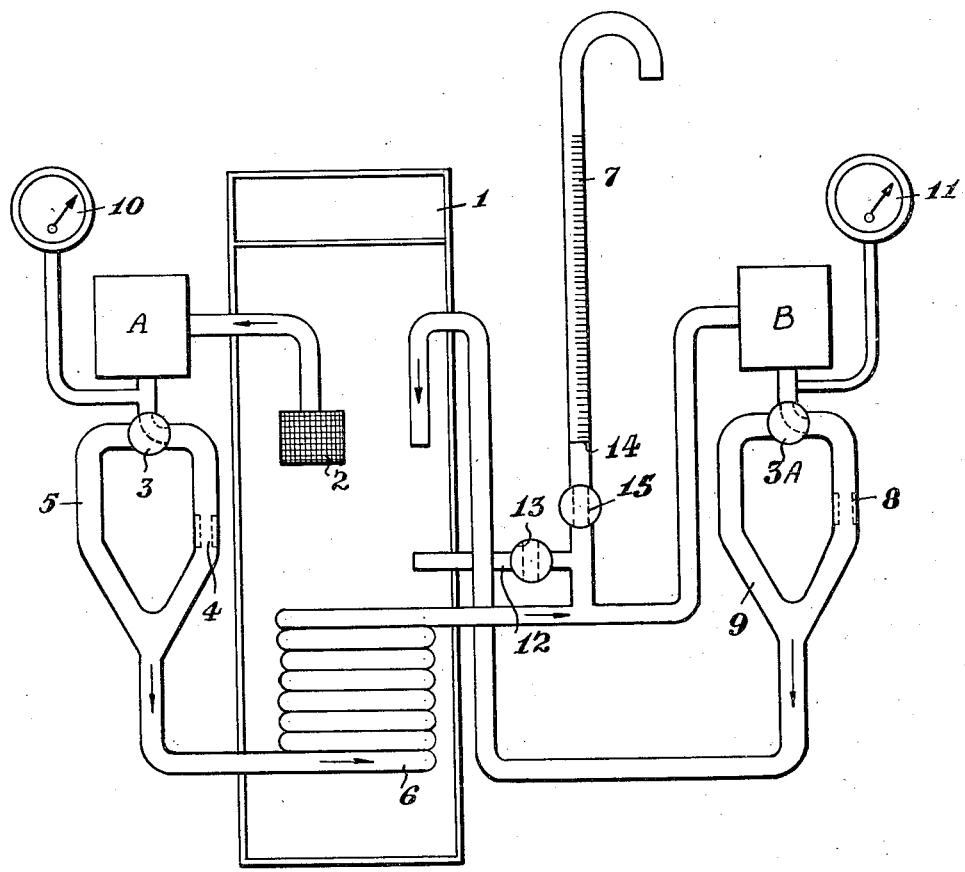

2,795,950

METERING PUMP TESTER

William Liddell, Harrogate, England, assignor to Imperial Chemical Industries Limited, London, England, a corporation of Great Britain Application October 28, 1954, Serial No. 465,396

Claims priority, application Great Britain November 5, 1953

3 Claims. (Cl. 73—3)

This invention relates to apparatus for testing metering pumps. More particularly it relates to apparatus for grading a number of pumps into groups having an output between specified tolerance limits.

Metering pumps are used in many fields of industry. In the manufacture of artificial filaments for example, they are used for pumping fibre-forming materials at a substantially constant rate, through filters to the spinneret. Metering pumps may be piston pumps but continuously rotating gear pumps are preferred, particularly for melt-spinning. In melt-spinning the diameter of the spun filaments is determined, other conditions being equal, by the basic designed output of the pump less the amount of slip which is due to the high pressure against which the pump is working, e. g. from filter packs.

Due to the engineering tolerances in the manufacture of pumps of nominally identical output, both the designed capacity and the slip characteristics vary from pump to pump, so that a number of pumps all running at the same speed i. e. when driven by a common shaft, actually give a range of different outputs. In melt-spinning, this variation in output from one pump to another causes undesirable variations in the diameter of the spun filaments or in the case of yarn, variations in the denier. It is normal practice to test each pump for output and slip, and to select pumps so tested and to arranged them in groups so that the pump output in each group of pumps is substantially the same.

Hitherto, metering pumps have been tested by pumping oil through a needle valve, set to give a high output pressure, and by measuring the amount of oil collected for a standard number of pump revolutions at a standard speed. This method has the disadvantage that it is very temperature dependent, as the degree of slip of the pump is very sensitive to temperature changes and moreover the oil temperature rises during tests under the action of the pump. Apparatus fitted with temperature control devices and automatic output collection devices are expensive and cumbersome.

I now provide a simpler improved apparatus where these difficulties are overcome, where no complicated temperature control and no automatic collecting device is required, and where changes of temperature are automatically compensated, the pump under test being compared with a master pump of known properties.

The present invention comprises apparatus for testing a metering pump wherein the pump under test is connected in series with a master pump via a liquid level indicating device, and a liquid pump from one pump to the other, each pump pumping the liquid through a device e. g. an orifice, sufficiently small to build up pressure in each pump and preferably of identical dimensions, any difference in the output of the two pumps being shown or measured by means of the liquid level or pressure indicating device.

In one method of operation, the master pump of known performance is fed from a reservoir of oil which it pumps through an orifice into a tank. The tank is provided with an accurate liquid-level indicating device and a connection, preferably at its base, to the inlet of the pump under test. The pump under test is driven at the same rate, preferably from the same shaft, as the master pump and pumps the liquid from the tank back to the reservoir, through an orifice of identical dimensions to the one which is connected to the master pump. The pumps are tested by driving them for a given number of revolutions. The liquid-level indicating device then shows by how much the output of the pump under test is greater or smaller than the output of the master pump, by a rise or fall in the liquid level in the balancing container. If the output of both pumps is the same, the level and pressure in the balancing container will remain steady.

The liquid-level indicating device may be a narrow calibrated glass tube, when the levels before and after a given number of revolutions of the pumps can be read off with accuracy, but any other liquid-level indicating device may be used. Instead of the liquid-level indicating device a pressure indicating device may be used.

In order to bring the liquid-level after each test back to a pre-determined level, the tank may be connected through a valve and pipe with the reservoir.

In the foregoing description, the master pump feeds the pump under test. This is of course not essential and the order may be reversed. In one method of operation, one master pump may be used with two test pumps, one feeding and one being fed by the master pump with a tank and liquid-level indicating device between each pump.

For ease of operation, it is preferred that the two pumps should be of the same size and pump through identical orifices. This is not essential however, as the master pump is always used as a standard, and any group of pumps of similar size can therefore be tested by comparing the differences between each member of the group and the standard master pump. It is of course possible to measure the actual output of any single pump, but this is not usually necessary as a comparison is all that is required. To obtain an accurate assessment of how the pump will work under operating conditions, it is advisable to select an orifice which will build up a pressure in the pump corresponding to that under which the pump normally operates.

It is preferable to arrange that the oil emerging from the master pump is passed into a tank of sufficient capacity to allow for temperature equalisation before passing to the inlet of the pump under test. It is further preferred that the tank should be surrounded by the oil in the reservoir to facilitate such temperature equalisation. This can best be done by using a tank having a large ratio of surface area to oil volume, such as a thin flat tank or a tank in the form of a coiled pipe.

When the bulk temperature and viscosity of the oil or other test liquid changes for any reason, the accuracy of the test is not affected, as both pumps are circulated with the same liquid and no elaborate thermocontrol equipment is required. A large number of metering pumps tested using the method of my invention showed that the reproducibility of the tests on a given metering pump was ±0.05%. This indicates that the method of my invention is 10 to 20 times more accurate than those of the prior art.

The master pump may be a standard pump always used for testing or may merely be a production pump which is known to give good results.

The diagrammatic drawing illustrates but does not limit my invention. In the drawing, master pump A is connected in series with the pump B under test and pumps a silicone oil of 10 poises viscosity. Both pumps are driven at the same speed from a common shaft. Oil from a reservoir 1 is taken up through a filter 2 by the master pump A and is pumped through a valve 3 either through an orifice 4 or through a by-pass 5. The filter 2 is provided to prevent particles getting into the pumps or the orifices 4 and 8. When the oil is pumped through the orifice 4 pressures of 100–200 p. s. i. are developed and the oil gets hot. In order to obtain comparative results with the pump under test, the oil temperature is equalised by passing it through a cooling coil 6 inside the reservoir. From here it reaches the inlet to the pump B under test via the liquid level indicating device 7. The pump B under test then pumps the oil through an orifice 8 which is identical with the orifice 4, or through a by-pass 9 back to the reservoir 1. There are pressure gauges 10 and 11 between the pump outlets and the orifices 4 and 8 which serve to check the equality of the orifices, blockages, or the presence of air bubbles. There is a connecting pipe 12 and a stop cock 13 between the reservoir 1 and the liquid level indicating device 7 to allow the resetting of the indicator to a particular level. A stop cock 15 is provided in the liquid level indicating device 7, which is shut off automatically after a specified number of pump revolutions, to allow reading of the liquid level.

In operation, when the valves 3 and 3A are set to direct the flow of oil through the orifices 4 and 8 which are both of the same size, and the pump A has a greater output than pump B, the column in the liquid level indicating device 7 will rise. If the difference between the pumps is too great the oil will overflow through the open end of the liquid level indicating device 7. If, on the other hand, the pump B has a greater output than pump A, the level of oil in the liquid level indicating device 7 will fall. The pumps are stopped to prevent the intake of air, when the level of the oil falls below a limit mark 14 on the device 7.

By means of the apparatus it is possible to grade the pumps and to arrange them in groups according to their outputs as the difference registers on the liquid level indicating device. The pumps are run simultaneously for a specified number of revolutions. Instead of the direct liquid level indicating device 7 an indirect liquid level indicating device such as a pressure gauge can be used.

It will be appreciated that pumps having different outputs can also be tested. If the pump A has a larger output than pump B the amount of oil which overflows during a specified number of revolutions of the pumps can be measured and the ratio of the capacities of the pumps determined.

What I claim is:

1. Apparatus for testing liquid metering pumps comprising a master pump, means connecting said master pump and a pump to be tested in series, a flow indicating device in communication with said series connection, and means for equalizing the temperature of the liquid entering both pumps.

2. Apparatus according to claim 1, wherein said means for equalizing the temperature includes a reservoir feeding the first pump in series, and said series connection includes a cooling coil positioned in said reservoir.

3. Apparatus according to claim 1, including an orifice in communication with the outlet of each pump effective to build up pressure therein.

References Cited in the file of this patent

UNITED STATES PATENTS

| | | |
|---|---|---|
| 1,061,271 | Dezendorf | May 13, 1913 |
| 1,422,089 | Dezendorf | July 11, 1922 |
| 1,774,723 | Packard | Sept. 2, 1930 |
| 2,631,451 | Ford | Mar. 17, 1953 |